(12) United States Patent  (10) Patent No.: US 8,473,240 B2
Manneschi  (45) Date of Patent: Jun. 25, 2013

(54) SYSTEM AND PROCESS FOR CONTROLLING A PERSON

(76) Inventor: Alessandro Manneschi, Arezzo (IT)

( * ) Notice: Subject to any disclaimer, the term of this patent is extended or adjusted under 35 U.S.C. 154(b) by 481 days.

(21) Appl. No.: 12/645,879

(22) Filed: Dec. 23, 2009

(65) Prior Publication Data

US 2010/0161241 A1   Jun. 24, 2010

(30) Foreign Application Priority Data

Dec. 24, 2008   (EP) ..................... 08172902

(51) Int. Cl.
*G06F 11/30* (2006.01)
*G01S 13/00* (2006.01)

(52) U.S. Cl.
USPC .............. 702/127; 702/150; 342/22

(58) Field of Classification Search
USPC ............. 702/85, 127, 150; 342/22, 27, 192; 340/573.1
See application file for complete search history.

(56) References Cited

U.S. PATENT DOCUMENTS

2004/0012398 A1   1/2004  Bailey et al.
2004/0263379 A1*  12/2004 Keller .................. 342/22
2005/0231421 A1  10/2005  Fleisher et al.
2007/0114418 A1   5/2007  Mueller et al.

FOREIGN PATENT DOCUMENTS
WO   9921148 A1   4/1999

OTHER PUBLICATIONS

European Search Report, EP 08172902, dated May 19, 2009.

\* cited by examiner

*Primary Examiner* — Manuel L Barbee
(74) *Attorney, Agent, or Firm* — Lerner, David, Littenberg, Krumholz & Mentlik, LLP

(57) ABSTRACT

System for controlling a person (P), characterized in that it comprises:
a kiosk (10) with an analysis zone (16) destined to accommodate a person (P) to control,
a frame (30) disposed inside the kiosk (10), the frame having a hollow (32),
a plurality of sensors (31) disposed on the frame (30), each sensor being able to collect information from a portion of the hollow (32) and to generate signals representative of the information,
an actuator (20) for translating the frame (30) inside the kiosk (10), a frame envelop (33) being defined by the translation of the hollow (32) when the frame (30) is translated, the analysis zone being included in the frame envelop,
a processing unit (60) for analysing the signals generated by each of the plurality of sensors (31) and to detect from the signals the possible presence of searched items within the analysis zone (16).

28 Claims, 15 Drawing Sheets

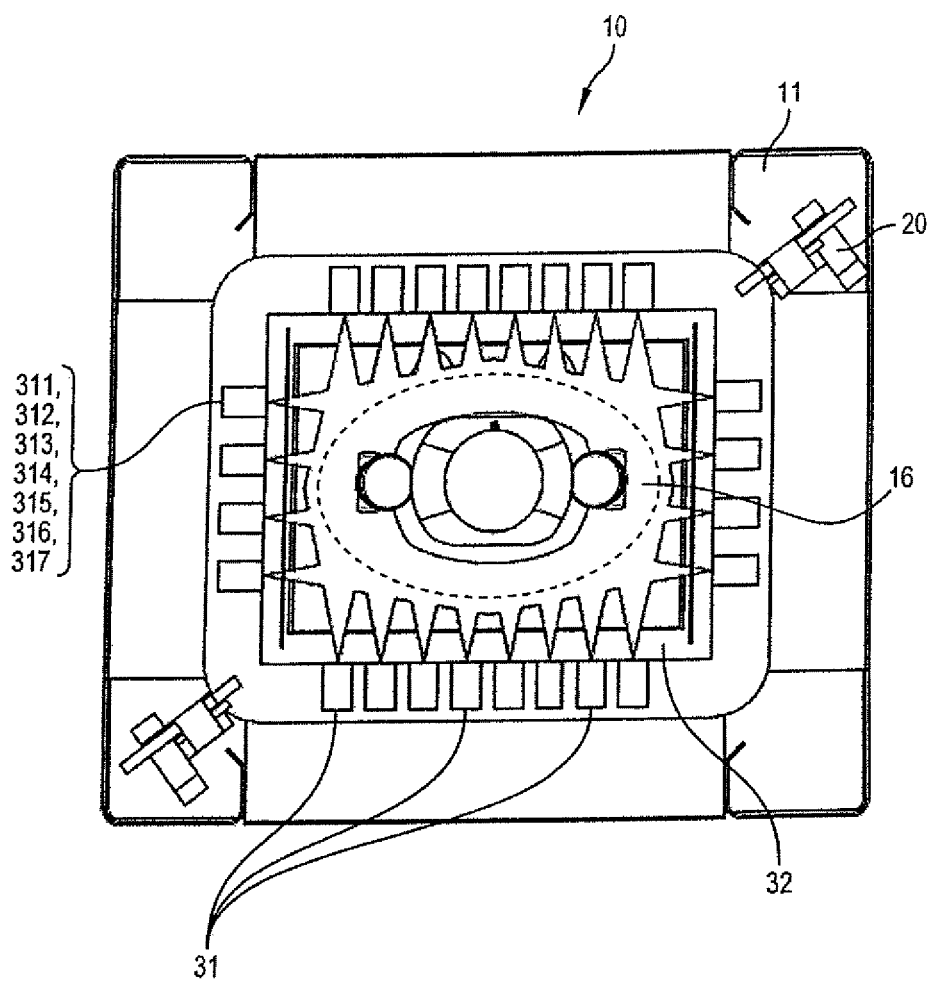

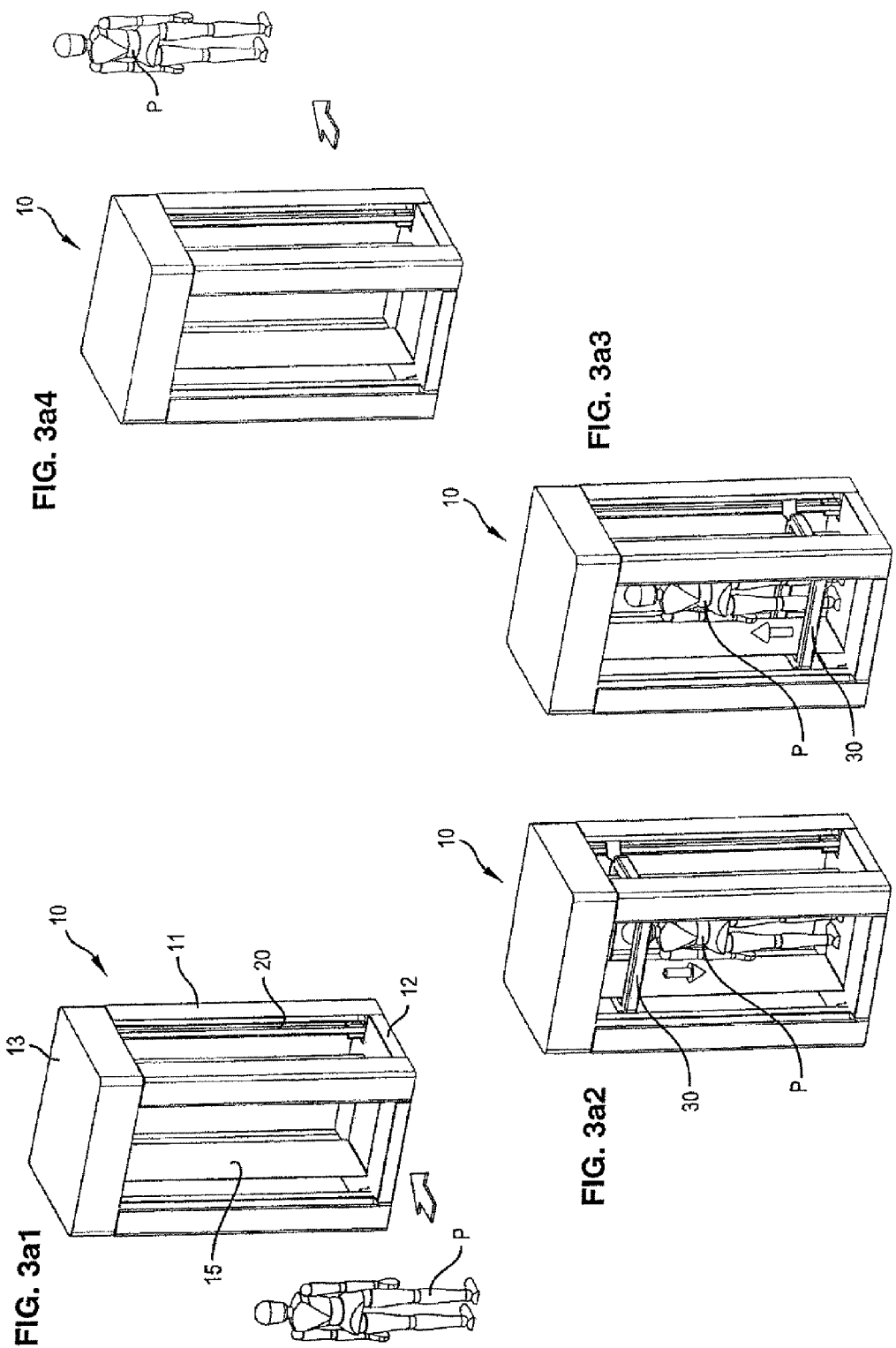

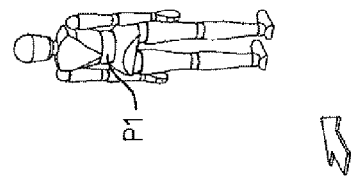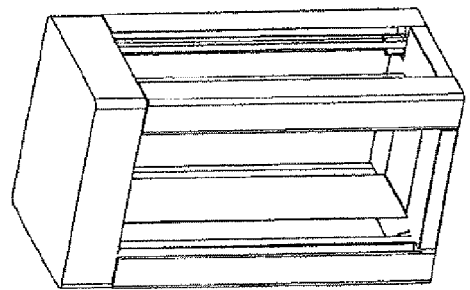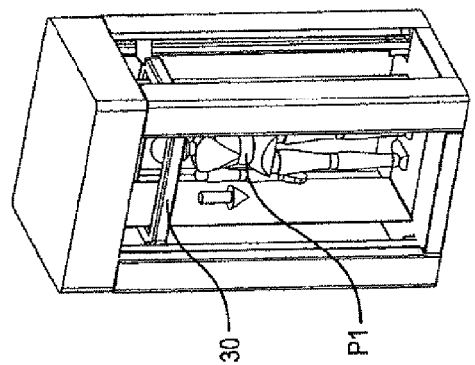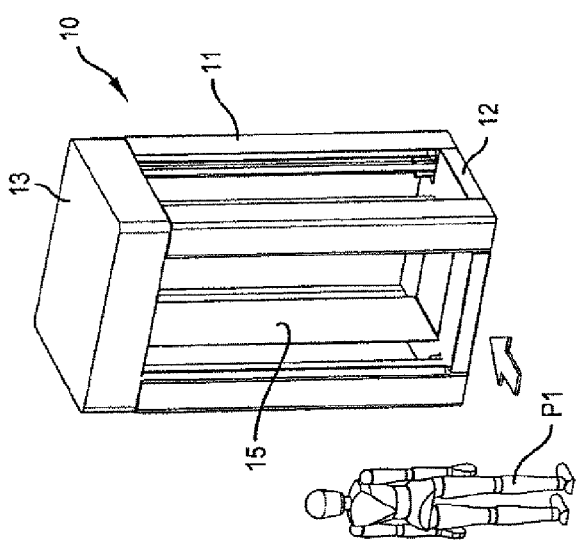

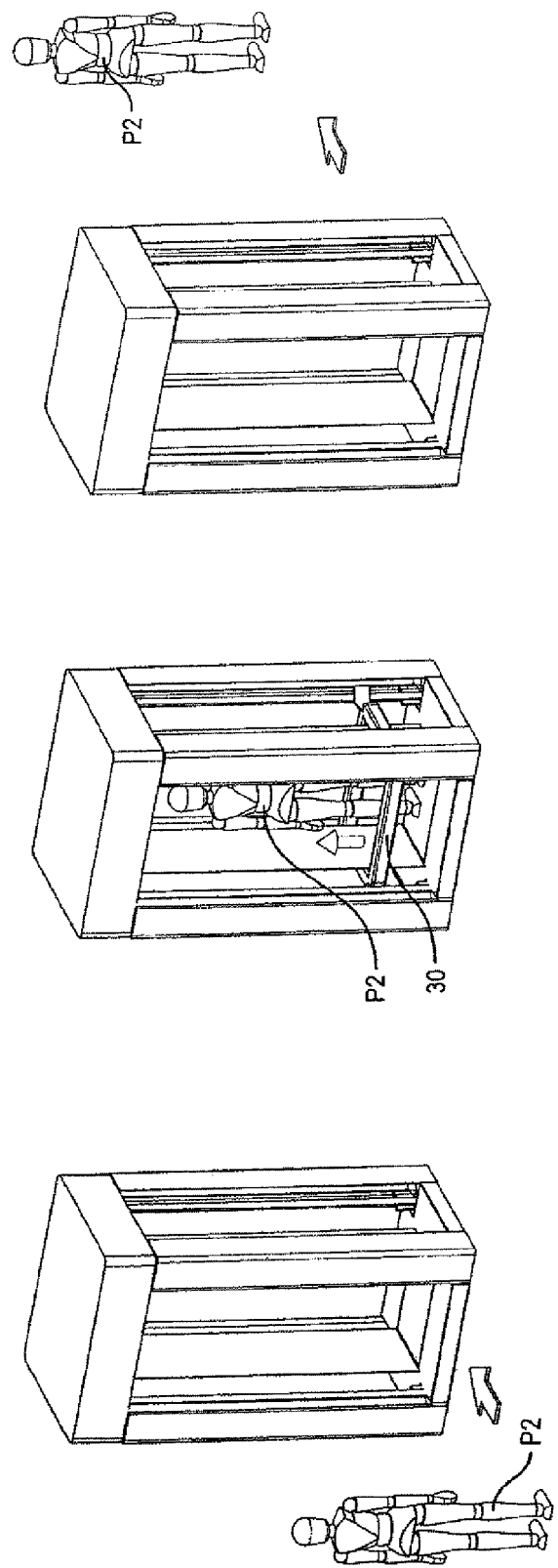

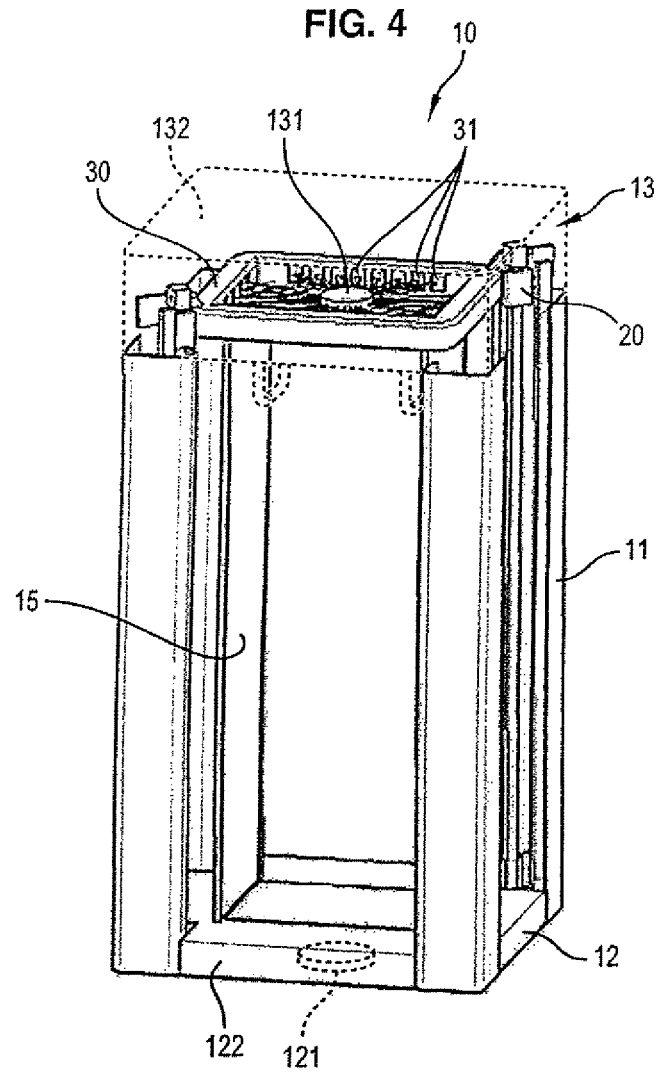

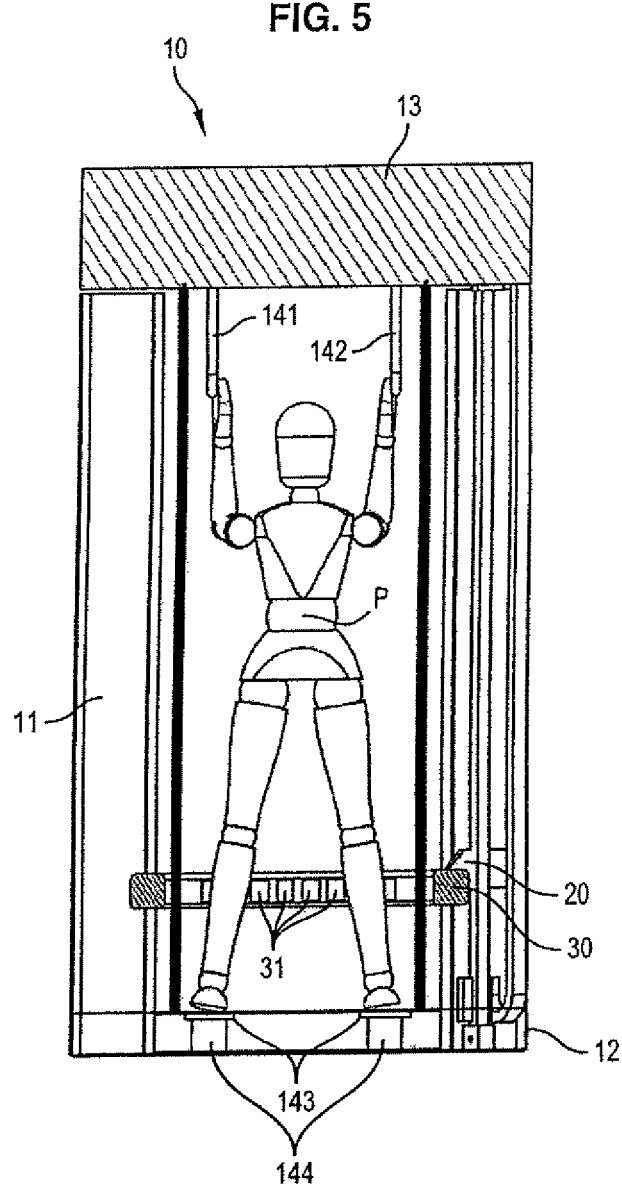

SYSTEM AND PROCESS FOR CONTROLLING A PERSON

CROSS-REFERENCE TO RELATED APPLICATIONS

The present application claims the benefit of European Application Serial No. 08172902.2, filed Dec. 24, 2008. The disclosure of which is hereby incorporated herein by reference.

This invention relates to the loss prevention field and more generally to the control of people in order to prevent the illicit removal or entrance of various types of items in controlled buildings.

BACKGROUND OF THE INVENTION

During the past few years, futuristic scenarios indicated the use of stand-off detection technologies for the design of new control stations in the buildings ways in/out, where people could be searched with minimum or no interaction at all, thanks to remotely placed sensing devices.

In reality these stand-off technologies are difficult to be deployed as the detection of the possible items of interest involves challenging physical problems. These problems are related to the small amount of materials to be found in comparison to the human body mass/surface and to the wide variability of the boundary conditions (position, shape, volume of both the item and the body). Still the close distance approach of the sensing devices to the body of the person remains the only effective working solution.

A current conventional control station is represented on FIG. 1a.

A person P to be controlled is required to place his/her hand baggage on an X-ray belt as well as his/her coat, jacket, purses and any major metal belongings (i.e. cameras, walk-mans, cell phones, etc.). After this first operation the person transits through a metal detector gate which is tuned to detect possible metal items, even of small size.

The metal detector gate is not able to detect items of composition other than metal, therefore, according to the search requirements, multiple technologies have to be used in sequence in order to complete the inspection process, for instance manual pat-down, manual collection of the particles on the surface of the body, followed by the analysis on a bench top analyzer.

With reference to FIG. 1b, radioactive substances can be detected through hand-held devices or more efficiently through additional dedicated gates.

In a few sites, special kiosks based on the same detection principle of the bench top analyzer have been installed; the person stops inside the kiosk and a suction system creates a strong air-flow around his/her body. The collected particles are analysed by a mass spectrometer with the purpose of detecting even minimum amounts of the searched substances.

FIG. 1c shows a layout of a control station with a recently proposed body scanner, to be used in sequence with the metal detector gate. The scanner is based on microwave imaging devices. The person is scanned by two vertical linear arrays, revolving around his/her vertical body axe. In other devices the person is asked to make a 360° turn around his/her body axe in front of a sensing panel.

From a technical perspective it is obvious that the use of multiple technologies is necessary, as a single sensor is not sufficient to measure the physical quantities involved in the detection of all the possible searched materials.

On the other hand the increasing number of technologies to be adopted in the control stations poses formidable problems of:

surface requirement, the available room being limited and in many instances even scarcely sufficient for the traditional layouts, workforce needed for the management of the various devices, multiple detection devices requiring more dedicated controllers in order to ensure the process of a sufficiently high flow rate of people.

controllers training, each installed equipment requiring specific training for its use and an appropriate refresh training planning over the years.

The above problems involve an increase of the cost of the operations but, above all, a critical layout of the control station, which becomes very crowded in terms of equipment and difficult to be managed, associated with complicated procedures and related increase probability of mistakes.

Moreover, the use of body scanners raises ethical and image copyright problems, as it provides a naked outline of the person to analyse. The possibility of body scanner use has called a controversy in the United States and in Europe. The invention aims at overcoming at least one of the above mentioned problems.

Accordingly, the invention proposes a system for controlling a person as described in claim 1.

The invention shows numerous advantages.

In particular, the system according to the invention allows to control a person for several possible searched items within a few seconds and to significantly reduce the control station surface dedicated to the control.

The system further allows estimating the location of a found item on the person without providing his/her naked outline.

FIGURES DESCRIPTION

Other characteristics, aims and advantages of the invention will become obvious to the reader of the following description, which is purely illustrative and not limitative and should be read in combination with the annexed drawings, on which:

FIG. 1a to 1c have already been described and represent control stations according to the prior art;

FIG. 2b shows a top section view of a kiosk where a person is situated for control according to an aspect of the invention;

Figure 1A:
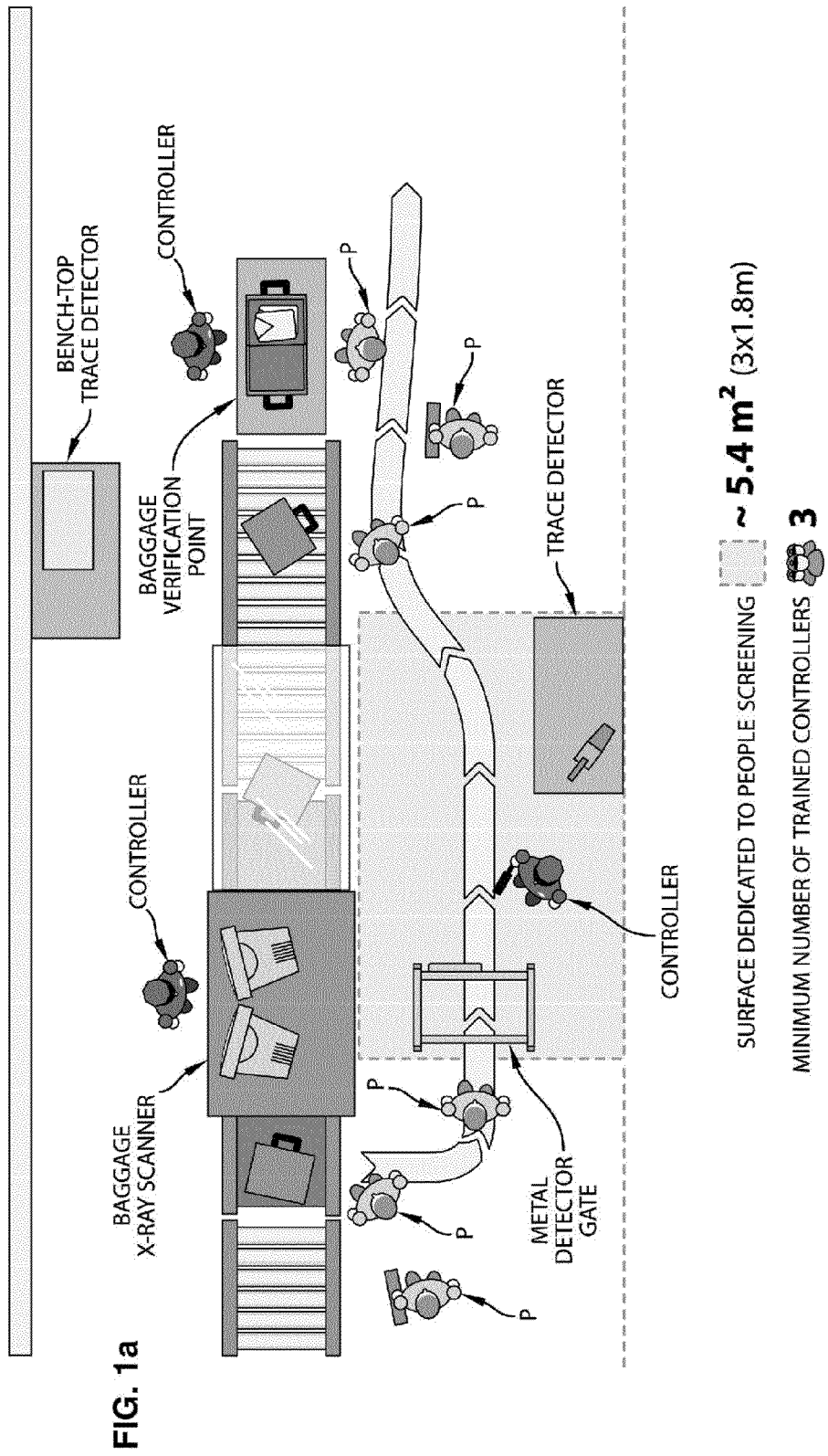
Figure 1B:
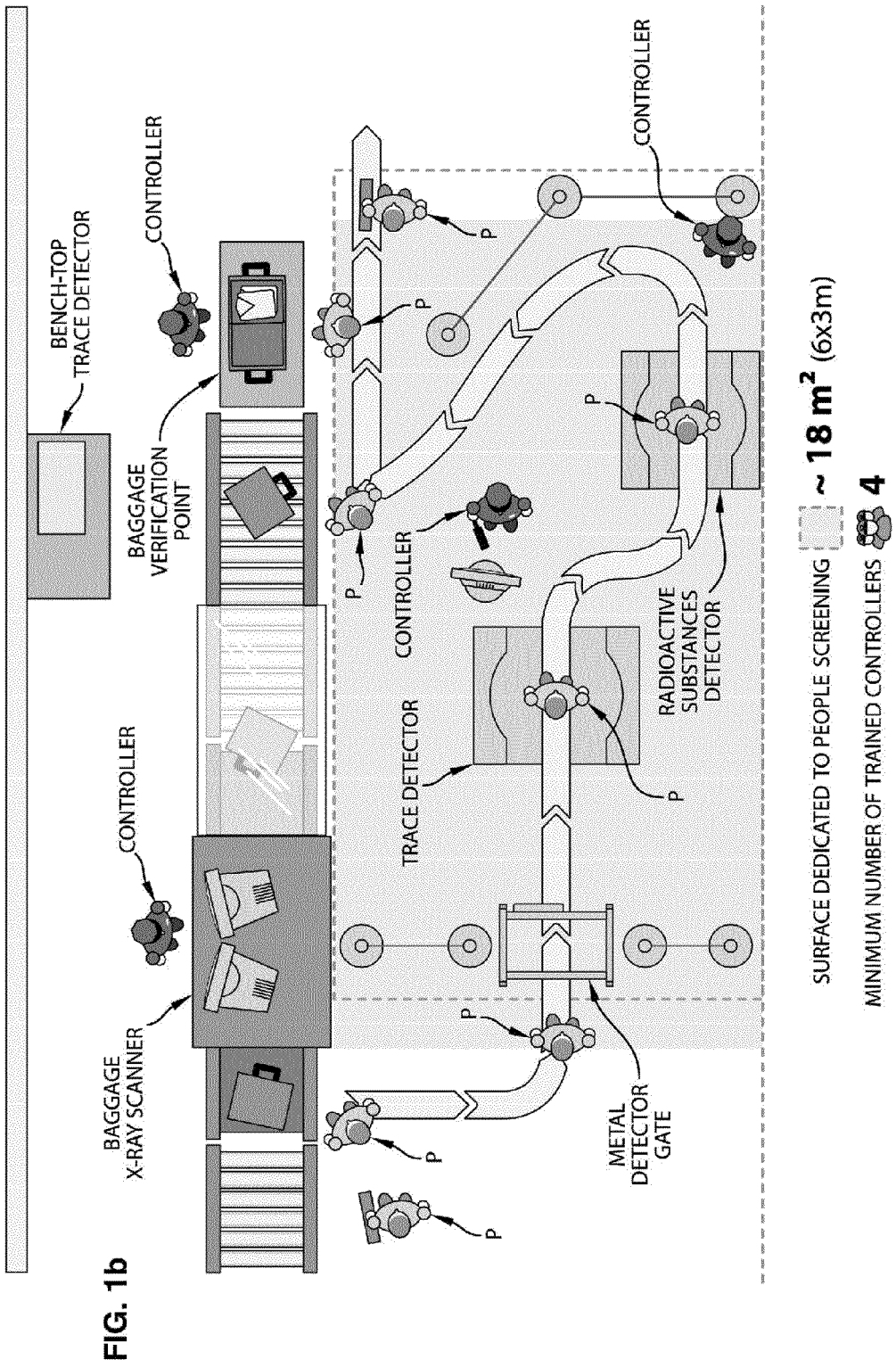
Figure 1C:
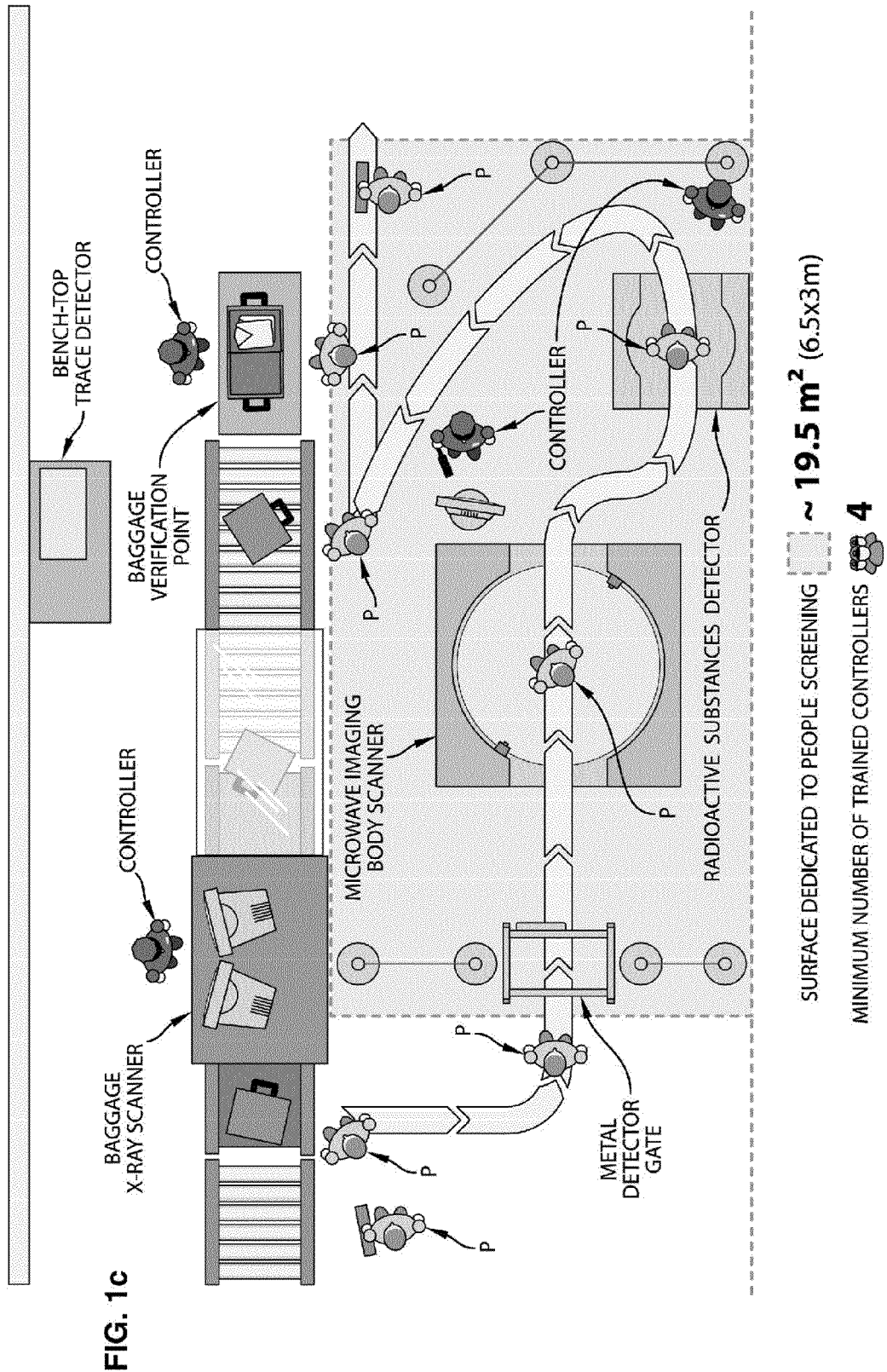
Figure 6:
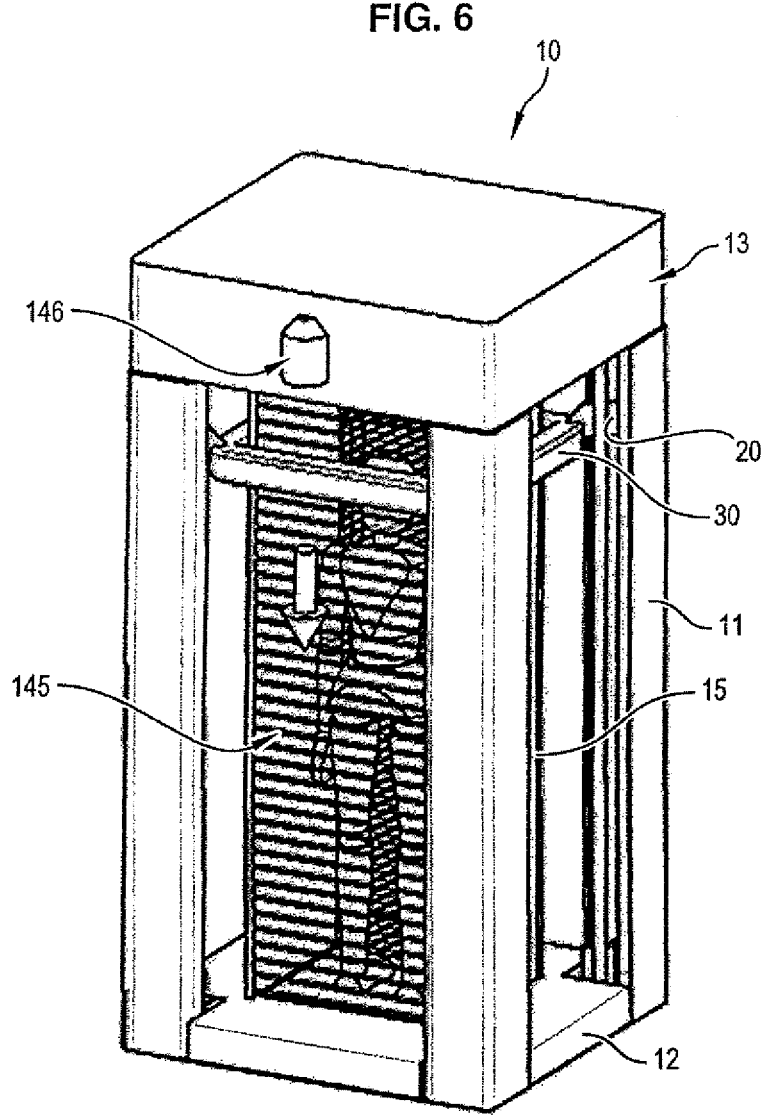
Figure 7:
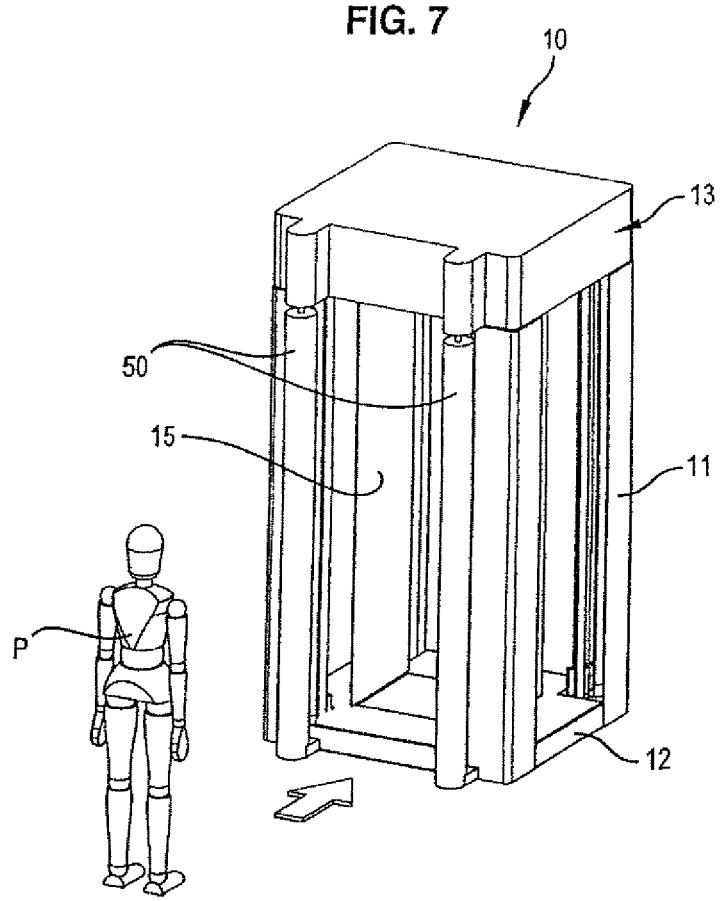
Figure 8:
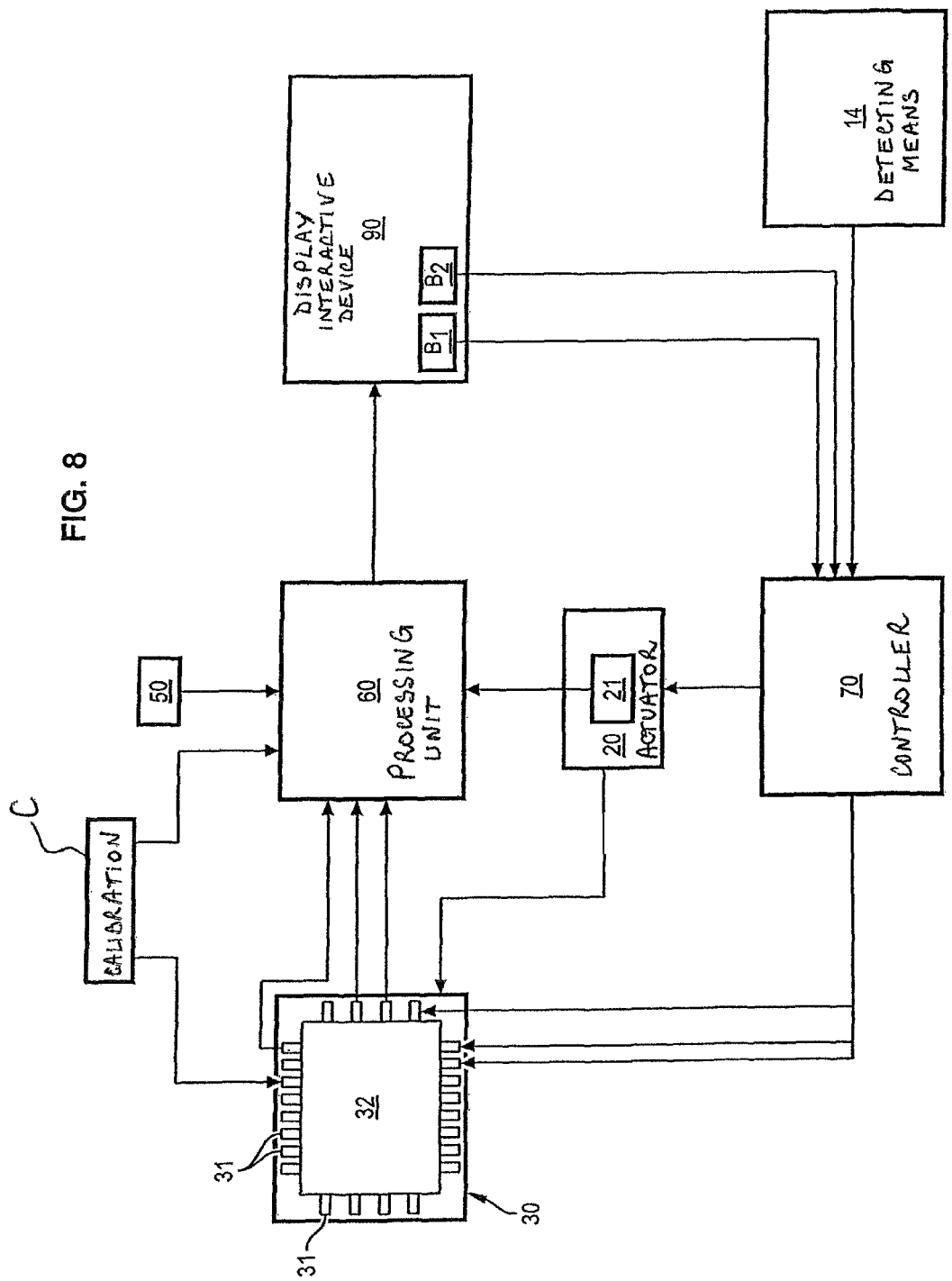
Figure 9:
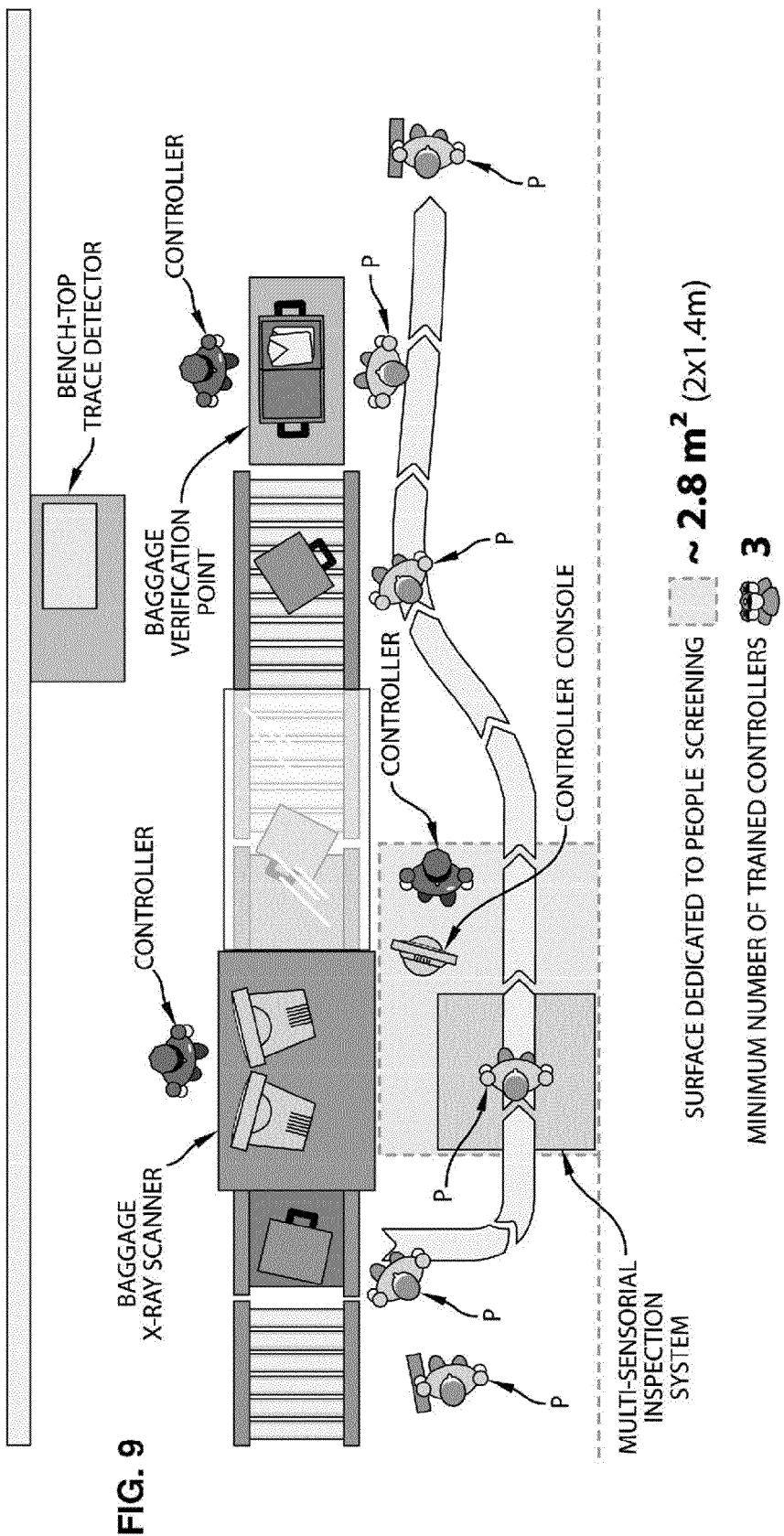
Figure 10:
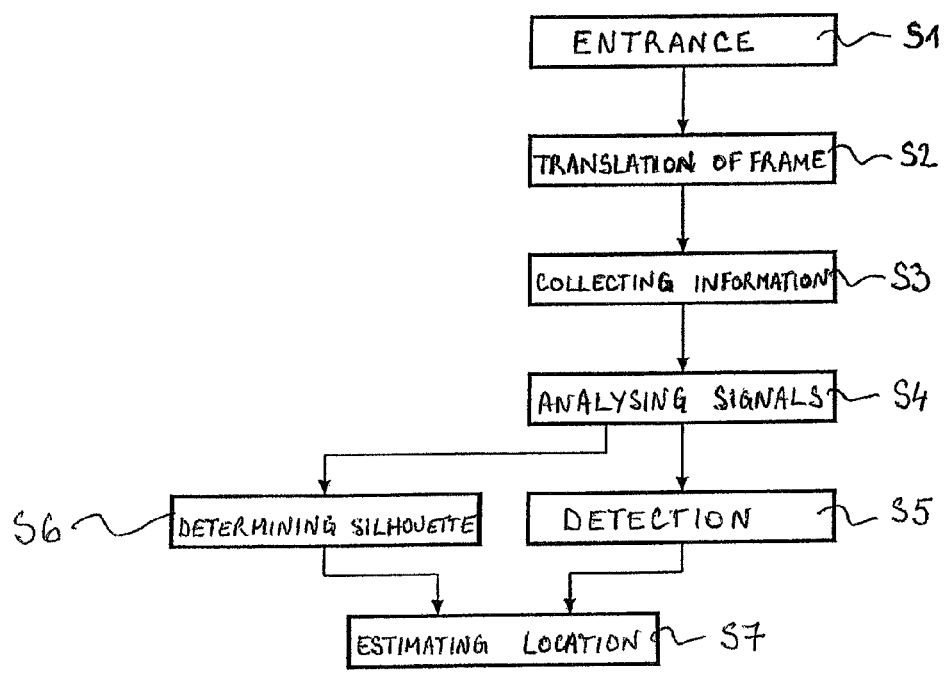

FIGS. 3a1 to 3a4 show the sweep of a person to control according to an aspect of the invention;

FIGS. 3b1 to 3b6 show two consecutive sweeps of two persons to control according to an aspect of the invention;

FIG. 4 shows a kiosk with reference calibration sources according to an aspect of the invention;

FIG. 5 shows a kiosk with detecting means destined to ensure that a person to control is in an analysis position according to an aspect of the invention;

FIG. 6 shows a kiosk with detecting means destined to ensure that a person to control is in a specified zone according to an aspect of the invention;

FIG. 7 shows a kiosk with a metal detector according to an aspect of the invention;

FIG. 8 represents schematically a system for controlling a person according to an aspect of the invention;

FIG. 9 represents a control station using a system for controlling a person according to an aspect of the invention; and FIG. 10 represents schematically a method for controlling a person according to an aspect of the invention.

DETAILED DESCRIPTION

The system according to the invention allows the control of a person using multiple sensors at the same time in the most effective geometry. One aim of the invention is to minimize the distance between the sensors and the surface of the person.

At the same time this invention, as it will be evident by the following description, minimizes the space required for the deployment of the technologies required for the control, solving the problem of the scarce available room in the entrance hall of public or private buildings.

As further advantage this invention integrates all the required sensors in a single carriage frame, therefore reducing substantially the number of workers required for the control and the related labour cost. As a consequence of this integration, the control procedures will be also simplified and the probability of a human mistake lowered as well.

As additional advantage of this invention, the mechanism will allow the subsequent installation of future additional sensing technologies without changing the basis and the logic of the mechanism itself.

As additional advantage of this invention the person to be controlled will be kept in the control process the minimum possible time, resulting in a minimum inconvenience for the person and in a maximum flow rate. The person under control is only requested to stand by in an analysis position for a few seconds.

In order to describe the invention we should first remind that in a control process each person has to be searched on all his/her person surface.

In the most traditional situation, the manual pat-down, the controller starts from the upper side of the person going down to the legs. For each height the controller touches the person for the full width. The process is repeated twice, one for each side, front and rear. The full control takes about 30-40 seconds and it relies on the capability of the controller to "feel" with his/her hands the presence of an extraneous item. The quality of this process could be compromised in case a certain area of the person is involuntary not covered or if the item is too small or too thin to be found by hands search. In addition this process is intrusive as it requires the physical contact with the controlled person.

In any case, even if affected by the above indicated drawbacks, the manual pat-down is the most time efficient manual procedure as it is carried out in successive horizontal stripes, along the vertical (main) axe of the person, therefore minimizing the control time.

With reference to FIG. 8, a system for controlling a person according to an aspect of the invention generally comprises a plurality of sensors 31 disposed on a frame 30. The frame 30 is situated in a kiosk 10 (not shown on FIG. 8) with an analysis zone 16 (not shown on FIG. 8) destined to accommodate the person to control.

The system further comprises an actuator 20 for translating the frame inside the kiosk. The translation of the hollow 32 of the frame defines a frame envelop 33 (not shown on FIG. 8). The analysis zone is of course included in this frame envelop.

While the frame is translated by the actuator 20, the sensors collect information inside a hollow 32 of the frame and generate signals representative of the information.

A processing unit 60 analyses the signals and detect from them the possible presence of searched items within the analysis zone.

Several types of sensors 31, well known in the public domain, can be advantageously installed on board of the frame, stacked one over the other or side by side, in a way that multiple items can be found with a single pass of the frame. Hence, the sensors are able to collect information on a plurality of physical units and allow simultaneous reading of several possible item signals. They provide real time reading of the characteristics of the body while the frame is translated.

The plurality of sensors 31 preferentially includes passive and active induction sensors (311, 312), passive and active microwave sensors (313, 314), infrared sensors (315) or gamma ray sensors (316).

The frame is beneficially arranged so that sensors other than electromagnetic ones can be installed on board of it without changing the way of work of the system.

The processing unit 60 is able to merge and cross-correlate the signals generated by the sensors and to compare them with specified thresholds.

The results of the analysis may profitably be visualized by a controller on an interactive device 90. They may also be transmitted to an external data network, in order to allow their collection in external data base or in order to be merged with other data from other sensing systems.

Advantageously, the system further comprises at least one reference calibration source C allowing a precise recalibration of the sensors and of the processing unit, for example before every person control.

Therefore, the interpretation of the signals by the processing unit 60 is more accurate.

The system profitably comprises means 70 for controlling the analysis, which can start the sensors and trigger the actuator 20 at an adequate time.

The interacting device 90 preferentially comprises a manual analysis button B1 and an emergency button B2 controlling the means 70, so that a controller may manually starts the analysis and stop an analysis in the case of a dangerous situation, for example if the person has exited the analysis zone 16 during movement of the frame (30)

A kiosk 10 of the system according to an aspect of the invention will now be described in detail with reference to FIGS. 2a and 2b.

The kiosk is preferentially equipped by an entrance side, an exit side and boundary walls 15, so that a person P can easily figure out how he/she is supposed to enter the kiosk.

The kiosk may also comprise an entrance door and an exit door.

The kiosk 10 profitably comprises one or several guides 11, for example four, for guiding the frame 30 along a vertical trajectory when translated by the actuator 20. For example, the actuator 20 may comprise helicoidal screws or linear motorized axes.

The frame 30 may have a substantially rectangular or any other shape provided that it substantially defines a hollow 32, for example a substantially circular shape. It does not need to be a closed curve.

The frame 30 is preferably in a substantially horizontal position.

Figure 2A:
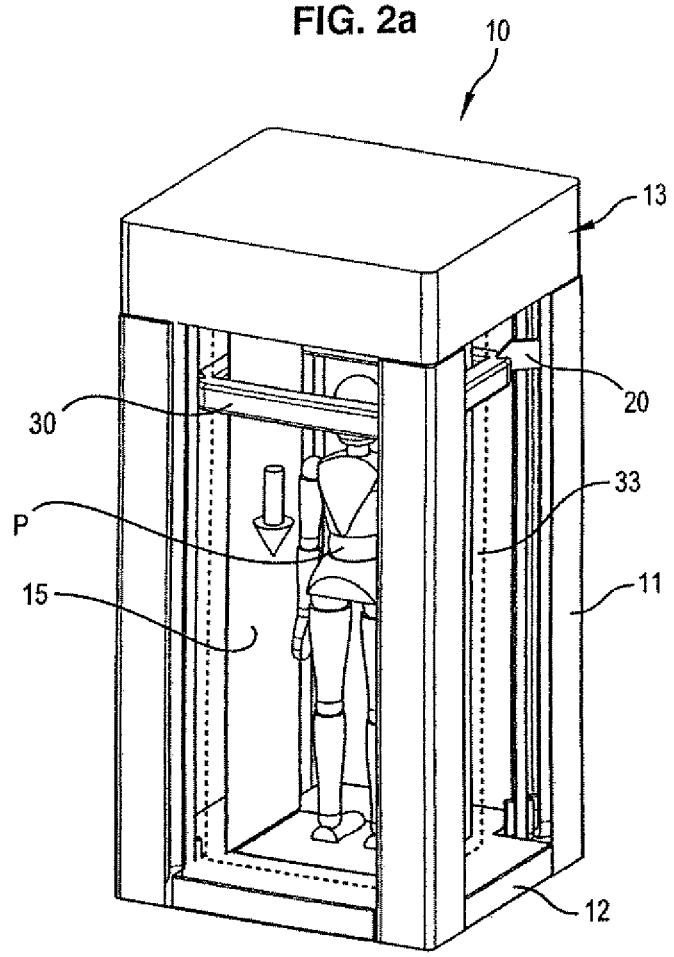
FIG. 2a shows from a high view point a kiosk where a person is situated for control according to an aspect of the invention.

The dashed lines on FIG. 2a represent the frame envelop 16, in which the person P under control is supposed to remain in order not to damage him/herself or the devices of the system.

The analysis zone 16 is represented in dashed lines on FIG. 2b. It corresponds to a zone from which each of the plurality of sensors 31 is able to collect information when the frame is translated.

Advantageously, the sensors are numerous enough and disposed on the frame 30 so as to cover the total circumference of a person P. Hence, when the frame is translated, they sweep an entire surface of the person P extending from the head to the feet, provided the person P is standing entirely within the analysis zone 16.

The processing unit 60 is beneficially synchronized with the frame actual height, for example by a rotary encoder 21 installed on the actuator 20.

Advantageously, the frame 30 carries optical sensors (317) to read the sensor-to-person distance in real time. Such information can improve the signal processing quality and allow the visualization of the person silhouette.

The processing unit 60 is then able to estimate the location of the possibly searched items on the silhouette of the person P, which makes it easy to actually find the items on the person afterwards.

Thus, the invention allows locating the searched items on a person without having to visualize his/her naked outline and to overcome the ethical issues related to the body scanner.

The kiosk 10 preferentially comprises a ceiling 13 and a floor 12.

As a non limitative example, the walls 15 of the kiosk have a width of about 80 to 100 cm. The floor 12 has the height of a step, namely about 15 cm or less. The entrance clearance is two meters at least and the total height of the structure reaches from 2.3 to 2.6 meters. The frame itself preferentially has an height of about 5 to 15 cm Preferentially, but not limitatively, the frame preferentially slides at a constant speed of 20-60 cm/s, from the housing 132 of the ceiling 13 down to the housing 122 and vice-versa.

With reference to FIG. 3a1 to FIG. 3a4, the sweep for controlling a person P according to an aspect of the invention comprises 4 steps. First, the person P enters the kiosk 10. Then, the frame slides top-to-bottom along the guides 11 of the kiosk 10 and slides back bottom-to-top. Finally, the person steps out of the kiosk 10.

The ceiling 13 beneficially comprises a housing 132 for accommodating the frame after translated bottom-to-top by the actuator.

Advantageously, the ceiling further comprises at least one calibration reference source 131. Hence, the sensors are recalibrated after each run.

In an advantageous arrangement represented with respect to FIGS. 3b1 to 3b6, the sweep of a first person P1 is processed in only one slide and the frame will wait inside a housing 122 of the floor 12 a next person P2 to be controlled, so that the sweeps will be performed with alternate top-to-bottom and bottom-to-top runs, ensuring a high operating time of the system.

Advantageously, the floor further comprises at least one calibration reference source 122.

For example, in the case of infrared sensors, the sensors will find, inside the ceiling 13 a "cold" calibration source—and inside the floor 12 a "hot" calibration source.

To ensure a safe control procedure, the system advantageously comprises detecting means 14.

According to a first aspect, the detecting means 14 are destined to detect if the person P is in a safe zone where it can not hurt him/herself nor damage any component of the system.

Preferentially, the safe zone is a specific section of the frame envelop 33, namely the frame envelop itself or a reduced section so that the detecting means 14 detect if a person comes too close from the frame envelop, in which case the person P could potentially damage the frame 30.

Advantageously, when the detecting means 14 deliver a detection result, the translation of the frame is stopped by the means 70.

The detecting means 14 advantageously comprise at least one motion detector—for detecting if a person gets in or gets out the frame envelop 33.

With reference to FIG. 6, the detecting means may comprise a photoelectric barriers 145, for example one through the entrance side and another one through the exit side.

As a non limitative example, each barrier is composed by a transmitter and a receiver linear beam array. If the person tries to enter or exit the frame envelop during the analysis procedure, the movement of the frame is immediately stop until manual reset by a controller.

The detecting means 14 may also include safety presence detector 146 to detect any person approaching too close from the kiosk 10, in which case the frame 30 is stopped.

According to another aspect, the safe zone is the analysis zone 16.

Moreover, the control may be facilitated if the person P takes an adequate position. For example raising the arms and sliding the legs open make it easier for the sensors to detect the searched items on the person.

We call "analysis position" such an adequate position. According to another aspect, the detecting means are further destined to detect whether a person P to control is in an analysis position.

The detecting means 14 are able to provide a detecting result when the person P is within the analysis zone 16, so that an analysis is started automatically when the person P is within the analysis zone 16 and/or in an analysis position.

Preferentially, the detecting means comprise one or two handles 141-142 adapted to be grabbed by a person, to ensure that the person raises the arms. The handles 141-142 may comprise contact sensors to detect automatically if the person has stopped grabbing them.

Beneficially, the detecting means 14 further include at least one weighing device for detecting a presence of a person in the frame envelop 33.

Advantageously, there are two weighing devices underneath two foot position indicators 143 with a given length between them. Thus, the detecting means 14 are able to detect if the person P slides the legs open for the control procedure.

Once the person has reached the analysis position, the means 70 automatically starts the analysis.

The means 70 can advantageously start the analysis after a predetermined time delay once the person is in the analysis position.

In case the person moves one or both hands or rise a foot, the frame translation is automatically stopped.

Hence, the version of the system with two feet position indicators 143 and two upper handles 141-142 requires a precise positioning of the person feet and hands, therefore optimizing the analysis by the sensor frame and ensuring the maximum safety of the system and of the person during the run of the sensors frame.

Indeed it is sufficient that the person rises a foot or leaves one or two hands from the handles in order to stop the movement of the sensor frame. Vice versa only when the person is satisfying all the correct positioning criteria the frame 30 will start its run.

In a possible alternative construction the kiosk 10 is equipped with a metal detector 50, for example a metal detector gate represented on FIG. 7. In this case the processing unit can merge the metal detector signals generated by the metal masses carried by a person entering the kiosk 10 with the signals of the plurality of sensors 31 in order to provide more complete information on possible transported items.

The combination of the sensors and the metal detector gate 50 allows a rapid analysis of the person and the detection of metal masses, dielectrics and radioactive materials with a single compact kiosk 10 and with a single unified interactive device 90 to the controller.

FIG. 9 represents a control station equipped with a system according to the invention. The engaged surface is smaller than—control stations using systems of the prior art, and the number of necessary controllers is lower too.

With reference to FIG. 10, a method for controlling a person P according to an aspect of the invention comprises:
- entrance S1 of the person into the analysis zone,
- translation S2 of the frame 30 inside the kiosk 10, the frame envelop 33 including the analysis zone 16,
- a step S3 of collecting information from the plurality of sensors 31 disposed on the frame 30,
- a step S4 of analysing signals representative of the information generated by the plurality of sensors 31, and
- a step S5 of detecting from the signals the presence of possibly searched items within the analysis zone 16 by the processing unit 60.

Advantageously, the method further comprising:
- a step S6 of determining a silhouette of the person P by the processing unit 60, and
- if searched items have been detected during step S5, a step S7 of estimating the location of said items on the silhouette by the processing unit 60.

The invention claimed is:

1. System for controlling a person, characterized in that it comprises:
   - a kiosk with an analysis zone destined to accommodate a person to control,
   - a frame disposed inside the kiosk, the frame having a hollow,
   - a plurality of sensors disposed on the frame, each sensor being able to collect information from a portion of the hollow and to generate signals representative of the information,
   - an actuator for translating the frame inside the kiosk, a frame envelop being defined by the translation of the hollow when the frame is translated, the analysis zone being included in the frame envelop,
   - a processing unit for analysing the signals generated by each of the plurality of sensors and to detect from the signals the possible presence of searched items within the analysis zone,
   - wherein the system further comprises detecting means destined to detect whether the person to control is entirely within a specific portion of the frame envelope.

2. System according to claim 1, further comprising at least one calibration reference source for recalibrating at least one of the plurality of sensors.

3. System according to claim 1, wherein the plurality of sensors is arranged on the frame so that, when the frame is translated, the plurality of sensors sweeps an entire surface of the person extending from the head to the feet, provided the person is standing entirely within the analysis zone.

4. System according to claim 1, wherein the kiosk comprises one or several guides for guiding the frame along a vertical trajectory when the frame is translated by the actuator.

5. System according to claim 1, wherein the kiosk comprises a ceiling with a top housing for accommodating the frame, the actuator being able to translate the frame into the top housing.

6. System according to claim 5, wherein the ceiling comprises at least one top calibration reference source for recalibrating at least one of the plurality of the sensors when the frame is in the top housing.

7. System according to claim 1, wherein the kiosk comprises a floor with a bottom housing for accommodating the frame, the actuator being able to translate the frame into the bottom housing.

8. System according to claim 7, wherein the floor further comprises at least one bottom calibration reference source, for recalibrating at least one of the plurality of sensors when the frame is in the bottom housing.

9. System according to claim 1, wherein the actuator is able to stop the translation of the frame in case the detecting means detect that a person (P) is not entirely within a specific section of the frame envelop.

10. System according to claim 1, wherein the detecting means is further destined to detect whether a person to control is within the analysis zone.

11. System according to claim 10, further comprising means for controlling the plurality of sensors and the actuator, wherein the detecting means are further able to provide a detecting result when a person to control is within the analysis zone so that an analysis is started automatically when the person is within the analysis zone.

12. System according to claim 1, wherein the detecting means are further able to detect whether a person to control is in an analysis position.

13. System according to claim 12, further comprising means for controlling the plurality of sensors and the actuator, wherein the detecting means are further able to provide a detecting result when a person (P) to control is in an analysis position so that an analysis is started automatically when the person is in an analysis position.

14. System according to claim 1, wherein the detecting means comprise one or two handles adapted to be grabbed by a person to control, to ensure that the person raises the arms to facilitate the control.

15. System according to claim 1, wherein the kiosk 10 comprises a floor 12 and wherein the detecting means comprise at least one weighing device for detecting a presence of a person in the frame envelop.

16. System according to claim 15, wherein the detecting means comprise two feet position indicators on the floor and one weighing device underneath each feet position indicator, to ensure that a person to control slides the legs open to facilitate the control.

17. System according to claim 1, wherein the kiosk comprises a floor (12) and wherein the detecting means comprise at least one feet position indicator on the floor.

18. System according to claim 1, wherein the detecting means comprise at least one motion detector for detecting if a person gets in or gets out the frame envelop.

19. System according to claim 1, wherein the frame is of substantially rectangular shape.

20. System according to claim 1, wherein the frame is of substantially circular shape.

21. System according to claim 1, wherein the frame is in a substantially horizontal position.

22. System according to claim 1, wherein the plurality of sensors is able to collect information on a plurality of physical units, the sensors comprising at least one sensor among:
   - a passive induction sensor,
   - an active induction sensor,
   - a passive microwave sensor,
   - an active microwave sensor,
   - an infrared sensor,
   - a gamma ray sensor,
   - and wherein the processing unit is able to merge and/or to cross-correlate the signals generated by the sensors.

23. System according to claim 22, wherein the plurality of sensors further comprises at least one optical sensor for detecting a distance between the frame and a person to control, so that the processing unit is able determine a silhouette of the person to control when the frame is translated by the actuator.

24. System according to claim 23, wherein the processing unit is further able to estimate the location of possibly searched items on the silhouette of a person to control.

25. System according to claim 1, further comprising a metal detector.

26. System according to claim 1, wherein the kiosk comprises at least one wall situated in the frame envelop.

27. Method for controlling a person, characterized in that it comprises:
 entrance of the person into an analysis zone of a kiosk,
 translation of a frame inside the kiosk, the trajectory of a hollow of the frame defining a frame envelop including the analysis zone,
 a step of collecting information from a plurality of sensors disposed on the frame,
 a step of analysing signals representative of the information generated by the plurality of sensors, and
 a step of detecting from the signals the presence of possibly searched items within the analysis zone by a processing unit,
 wherein the method further comprises the step of detecting whether the person to control is entirely within a specific portion of the frame envelop.

28. Method according to claim 27, further comprising:
 a step of determining a silhouette of the person by the processing unit, and
 if searched items have been detected, a step of estimating the location of said items on the silhouette by the processing unit.

* * * * *